United States Patent
Schmidt

(10) Patent No.: US 8,870,275 B1
(45) Date of Patent: Oct. 28, 2014

(54) ACTIVE AND PASSIVE BOUNDARY LAYER CONTROL FOR VEHICLE DRAG REDUCTION

(71) Applicant: Peter Schmidt, Frederick, MD (US)

(72) Inventor: Peter Schmidt, Frederick, MD (US)

(*) Notice: Subject to any disclaimer, the term of this patent is extended or adjusted under 35 U.S.C. 154(b) by 0 days.

(21) Appl. No.: 14/057,805

(22) Filed: Oct. 18, 2013

(51) Int. Cl.
*B64D 35/00* (2006.01)
*B64C 21/06* (2006.01)

(52) U.S. Cl.
USPC .................. 296/212; 296/180.4; 244/209

(58) Field of Classification Search
USPC ............. 244/207–209; 296/180.1, 180.4, 212
See application file for complete search history.

(56) References Cited

U.S. PATENT DOCUMENTS

| | | | |
|---|---|---|---|
| 2,037,942 A * | 4/1936 | Stalker | 180/89.1 |
| 2,416,991 A * | 3/1947 | Griffith | 244/209 |
| 2,920,448 A * | 1/1960 | Coanda | 60/39.49 |
| 3,317,162 A * | 5/1967 | Grant | 244/209 |
| 4,146,202 A | 3/1979 | Pender | |
| 4,690,245 A * | 9/1987 | Gregorich et al. | 181/272 |
| 4,776,535 A * | 10/1988 | Paterson et al. | 244/130 |
| 4,807,831 A | 2/1989 | Brewer et al. | |
| 5,058,837 A | 10/1991 | Wheeler | |
| 5,222,698 A * | 6/1993 | Nelson et al. | 244/203 |
| 5,348,256 A | 9/1994 | Parikh | |
| 5,407,245 A * | 4/1995 | Geropp | 296/180.1 |
| 5,417,391 A | 5/1995 | Savitsky et al. | |
| 5,721,402 A * | 2/1998 | Parente | 181/214 |
| 5,908,217 A * | 6/1999 | Englar | 296/180.1 |
| 6,068,328 A * | 5/2000 | Gazdzinski | 296/181.5 |
| 6,685,256 B1 * | 2/2004 | Shermer | 296/180.4 |
| 7,644,814 B2 | 1/2010 | Beattie | |
| 7,810,867 B2 | 10/2010 | Salaverry | |
| 2005/0061378 A1 * | 3/2005 | Foret | 137/888 |
| 2007/0187990 A1 * | 8/2007 | Shahbazi | 296/180.1 |
| 2009/0183632 A1 | 7/2009 | Peltonen et al. | |

OTHER PUBLICATIONS

Katz, J., "Race Car Aerodynamics Designing for Speed", Robert Bentley Automotive Publishers,1995, pp. 131 to 135, Cambridge.
Owczarek, J., "Introduction to Fluid Mechanics", International Textbook Company, 1968, pp. 380 to 389, Scranton, Pennsylvania.
Schlichting, H., "Boundary-Layer Theory", translated by J. Kestin, McGraw-Hill Book Company, 1987, pp. 33 to 44, New York, New York.

* cited by examiner

*Primary Examiner* — Tien Dinh
(74) *Attorney, Agent, or Firm* — Walter Ottesen P.A.

(57) ABSTRACT

An active and passive boundary layer control system and method for reducing boundary layer separation and the resulting form drag from ground vehicles. Tubings with multiple venturis connected in series are attached to the side and/or roof of the ground vehicle. A flow of compressed air is created by an engine auxiliary, e.g., a turbocharger or a supercharger, or by a designated blower and injected into the tubings. Suction created by the venturis actively removes decelerated fluid from the boundary layer and keeps the boundary layer flow attached. Optionally, the system exhausts the air in concentrated free jets along the vehicle body to a series of passive boundary layer control devices, such as vortex generators.

21 Claims, 6 Drawing Sheets

ACTIVE AND PASSIVE BOUNDARY LAYER CONTROL FOR VEHICLE DRAG REDUCTION

FIELD OF THE DISCLOSURE

This disclosure relates to a device and a method for reducing vehicle drag of a ground vehicle traveling at speed. Active and/or passive boundary layer control elements for preventing boundary layer separation are attached to a side wall and/or the roof of the ground vehicle.

BACKGROUND

Aerodynamic drag is created whenever a ground vehicle travels at speed. Aerodynamic drag is comprised of two principle components—skin friction drag and form drag. The skin friction drag is a consequence of the air's viscosity and the "no-slip" condition that exists at the vehicle's surface. Even for the flow of fluids of very low viscosity—air for example—there is a region where the effects of the fluid's viscosity dominates. This area is called the boundary layer. FIG. 1 shows the flow of a freestream of air 1, over a stationary wall 2. As a result of the no-slip condition 3 at the wall, the velocity at the wall 2 is zero. The layer of fluid that corresponds to the distance from the no-slip condition 3 at the wall to the re-establishment of the freestream velocity is called the boundary layer 4.

Within the boundary layer, adjacent layers of fluid will be traveling at different velocities. The different velocities are the result of shearing stresses that are produced in the fluid. The shearing stresses are produced by the fluid's viscosity. Outside the boundary layer—in the freestream—all fluid will be traveling at the same speed and the effect of the fluid's viscosity will be negligible. For the specific case of a ground vehicle, the no-slip condition dictates that the air immediately adjacent to the vehicle will travel at the same speed as the vehicle. As discussed above, outside the boundary layer the air will be traveling at the air's free stream velocity. For the purposes of this discussion it will be assumed that the vehicle is stationary and the air is moving at the vehicle's velocity. This convention does not change the physics involved but it does make for an easier situation to describe. The shearing stresses in the boundary layer that produce the velocity gradient across the boundary layer also act as a retarding force on the vehicle's motion—i.e., drag. This component of drag is called skin friction drag.

For high speed, streamlined vehicles like jet aircraft, skin friction drag is the major contributor to aerodynamic drag. FIG. 2 shows the flow of air over a symmetric airfoil, 5, with chord, 6. A freestream flow of air, 1, is introduced and directed over the airfoil, 5. Because of the streamlined shape of the airfoil, 5—only gradual changes in surface profile exist—the flow is largely able to proceed in a direction of decreasing pressure. As a result the boundary layer flow remains "attached" to the airfoil, 5. The attached flow is shown as 7.

However, for ground vehicles—particularly for bluff, i.e., non-streamlined bodies like tractor trailer trucks—the major contributor to drag is form drag. FIG. 3 shows the flow of a freestream of air over a typical automobile 8. Form drag is created by separation of the boundary layer from the vehicle. As described above, the shearing stresses present in the boundary layer cause the air in the boundary layer to slow down relative to the speed of the vehicle. As a result of its reduced energy content the boundary layer of air may no longer remain attached to the vehicle, particularly when the air is forced to flow into an area of increasing pressure. Areas of increasing pressure are produced by surfaces with a large radius of curvature or a geometric discontinuity. Areas of increasing pressure can be reduced by vehicle streamlining but there are practical limits on what can be achieved with streamlining commercial vehicles. In the flow of air around conventional ground vehicles areas of increasing pressure cannot be avoided. In places of increasing pressure the air can begin to recirculate or flow in the opposite direction.

This flow in areas of increasing pressure is seen in FIG. 3 as the air tries to flow along the vehicle's rear deck 9. The large radius of curvature of the deck leads to a large increase in area for the air to flow through and the air will slow down as a result. This is the same phenomenon that occurs in a diffuser and as with a diffuser the flow along the rear deck 9 leads to an increase in pressure. If the increase in pressure is sufficiently large the boundary layer flow of air around the vehicle can separate from the vehicle. Boundary layer separation is seen as 10. As the boundary layer separates, a large low-pressure wake 11 is created behind the vehicle. Inside this wake the air is at a lower pressure than it is at the vehicle front. The pressure gradient across the vehicle produces a net force that acts to prevent movement of the vehicle—i.e., drag. This component of drag is called form drag.

The separation of the boundary layer flow of air over a ground vehicle is identical to the stall of an aircraft wing. When a wing is generating lift, the flow of air around the wing remains attached to the wing. See FIG. 2. As long as the flow remains attached, the form drag produced by the wing remains very small. FIG. 4 shows an airfoil 5 of chord 6. The wing's angle of attack 12 is the angle the chord 6 forms with the freestream 1. As the wing's angle of attack 12 is increased, a point will be reached where the boundary layer flow of air separates from the wing 10. The location where the flow separates is called the separation point 13. As a result of this separation a large wake 11 will be produced behind the wing. The wake 11 causes the drag produced by the wing to rapidly increase. In addition, the separation of the flow also produces a large reduction in lift generated by the wing. The reduction in lift is the result of large areas of the wing no longer being exposed to the boundary layer flow of air and thus being unable to produce lift. In order to avoid the consequences of boundary layer separation and wing stall, aircraft are routinely provided stall warning devices. Upon receiving an alarm from the stall warning device, a pilot will typically reduce the aircraft's angle of attack by pitching the nose down or rolling the wings level.

Airplane wings are highly streamlined and operate at very high speeds, especially when compared to the speed at which a ground vehicle typically travels. Wings are designed to operate with very little form drag because the boundary layer flow of air around the wing remains attached under all operating scenarios. An example of form drag on a non-streamlined object for illustrating ground vehicle performance is provided by a golf ball.

Most ground vehicles—particularly tractor trailer trucks—are bluff bodies, just like a golf ball. FIG. 5 shows a golf ball 14 exposed to a freestream flow of air 1. The separation of flow from the golf ball is seen as 13. As a result of this separation of flow, a large low pressure wake 11 is created behind the ball. The large pressure difference across the golf ball opposes the motion of the golf ball and produces drag. Unlike the operation of an airplane wing where separation must be avoided at all cost—hence the use of stall warning systems and highly streamlined shapes—it is a foregone conclusion that the flow of air around a golf ball will result in boundary layer separation. This is the result of the golf ball's non-streamlined shape. Once it is accepted that the boundary layer will separate from a golf ball in flight, the question becomes how to minimize the form drag resulting from the large low pressure wake 11 created by the boundary layer separation. The answer is to add dimples to the golf ball.

There are two types of boundary layer flow—laminar and turbulent. In laminar boundary layers, the flow is well ordered and all layers of flow are essentially parallel to each other. In contrast, turbulent flow is much more chaotic and unordered. There is also significant mixing between adjacent layers of flow in turbulent boundary layers. As a result of this mixing and the higher energy levels that exist in turbulent boundary layers, turbulent boundary layers will remain attached longer than laminar boundary layers. The dimples on a golf ball are designed to "trip" the boundary layer flow from laminar to turbulent. By tripping the boundary layer into a turbulent flow regime, separation of the boundary layer from the golf ball is delayed and form drag is reduced. The practical result of the reduced form drag is a golf ball that travels farther. The effect of adding dimples to a golf ball can be seen in FIG. 6, which shows a golf ball 14 again exposed to a freestream flow of air, 1. The golf ball contains dimples, 15. The dimples trip the boundary layer from laminar to turbulent. This increases the energy in the boundary layer and delays separation. Comparison of FIG. 6 to FIG. 5 shows that separation 13 now occurs later when the ball is dimpled. The delayed separation reduces the size of the low pressure wake 11 and allows the dimpled ball to travel further than the "non-dimpled" ball.

The distinction between skin friction drag resulting from the effects of viscosity in the boundary layer and form drag resulting from boundary layer separation and the creation of a low pressure wake along with the different techniques that can be utilized to minimize form drag have been known for some time. Indeed, Ludwig Prandtl—who is credited with identifying the boundary layer—studied the effect of suction on boundary layer separation as far back as 1904. More recently, several patent citations discuss active control of the boundary layer system in order to reduce vehicle drag.

U.S. Pat. No. 4,146,202 pertains to a porous aircraft skin that can be used with a suction source to maintain laminar flow over an aircraft wing. A system that utilized both suction and cooling via a cryogenic fluid to reduce aircraft drag is disclosed in U.S. Pat. No. 4,807,831. The cryogenic fluid can be provided from the aircraft's propulsion system—liquid hydrogen and liquid oxygen. As a result, it is not necessary to carry a cryogenic fluid for the sole purpose of working as part of the drag reduction system. Nevertheless, such a system would not be practical for a ground vehicle.

U.S. Pat. No. 5,222,698 is directed at a system that uses turbulence monitors to determine whether the boundary layer is laminar or turbulent. In the event turbulent flow is detected, suction from an external source can be applied to the boundary layer until laminar boundary layer flow is reestablished. The system is designed for highly streamlined aircraft structures—engine nacelles. Unlike the golf ball example cited above, boundary layer separation can be avoided with these highly streamlined structures. In the case of highly streamlined surfaces traveling at aircraft speeds, drag is minimized by keeping boundary layer flow laminar and thus reducing the skin friction drag.

U.S. Pat. No. 5,348,256 and U.S. Pat. No. 5,417,391 also describe systems that utilize active control of the boundary layer through suction. In particular, U.S. Pat. No. 5,348,256 suggests reducing noise on supersonic aircraft by allowing operation at higher angles of attack and reduced engine power levels. U.S. Pat. No. 5,417,391 discloses a series of vortex chambers acting in concert with a suction source to control the boundary layer flowing over an aircraft wing for the purposes of increasing the wing's lift/drag ratio. Like the other disclosures discussed above, these systems are designed for aircraft applications and do not identify the source of the suction.

U.S. Pat. No. 5,407,245 addresses the reduction of drag on a ground vehicle. Specifically, this patent disclosure identifies the "pressure resistance"—i.e. the creation of the low pressure wake behind a vehicle—as the chief contributor to vehicle drag. Indeed, it is disclosed that the form drag can be more than six times the skin friction drag. The low pressure wake is reduced utilizing a blower at the vehicle's rear to inject a high speed jet of air, which is estimated to require a speed of 50 m/s (approximately 110 miles/hour)—at the location where the boundary layer would otherwise separate from the vehicle. The high speed jet of air adds energy to the boundary layer and prevents boundary layer separation and the attendant increase in form drag that boundary layer separation produces.

In addition, by virtue of the vehicle's shape, the orientation of the various slots used to inject the high speed air, and the "Coanda effect," a portion of the high energy air is also injected into the area of low pressure immediately behind the vehicle. U.S. Pat. No. 5,417,391 refers to this area as the "eddying zone," and the resulting injection of high energy air into the eddying zone coupled with the suction of air from the eddying zone further reduces vehicle drag. The design calls for two blowers to provide both the injection of high speed air to prevent boundary layer separation and the suction to pull air through the eddying zone. This citation recognizes that any practical system must save more energy in the form of drag reduction than it requires in energy to power the blowers.

U.S. Pat. No. 5,908,217 uses another design to prevent boundary layer separation at the rear of the vehicle. In particular, the design uses a "source of compressed air" and control valves to regulate the injection of high speed air in the boundary layer at the vehicle's rear. A control system is utilized to direct the flow of air through several different plenums. By directing air through different plenums not only can the drag on the vehicle be reduced, but it is possible to control the pitching and yawing moments on the car as well as providing improved stability. Similarly, U.S. Pat. No. 6,068,328 proposes a boundary layer control system utilizing a series of "external perforation arrays and suction sources controlled by a digital signal processor." The design utilizes a series of turbulence detectors to direct suction to those locations at risk of boundary layer separation.

Moreover, U.S. Pat. No. 7,810,867 suggests a vehicle wrapping product designed to fit over a vehicle's existing structure. The wrapping product is designed to induce turbulence in the boundary layer flowing over the vehicle. The "tripping" of the boundary layer from laminar flow to turbulent flow is intended to delay the onset of boundary layer separation and reduce the form drag. Essentially, the vehicle wrapping product performs a similar role to the dimples on a golf ball.

SUMMARY OF THE DISCLOSURE

Disclosed herein is a device for reducing aerodynamic drag of a ground vehicle, which includes a tubing having an intake port, an exit port, and a plurality of venturis, as well as a compressed air source being fluidly connected to the intake port, wherein the plurality of venturis is disposed between the intake port and the exit port, and wherein each venturi from among the plurality of venturis has a throat and a venturi opening.

Further, a method of reducing aerodynamic drag of a ground vehicle is disclosed, which comprises providing a tubing on at least one of a roof and a side wall of the ground vehicle, the tubing having an intake port, an exit port, and a plurality of venturis disposed between the intake port and the exit port; fluidly connecting a compressed air source to the intake port; and, removing a portion of a fluid from a boundary layer of the ground vehicle by suction through a venturi opening.

The present disclosure utilizes a series of venturi tubes to create suction at the vehicle surface. The system is typically optimized around reducing form drag from tractor trailer trucks at highway speeds, but is applicable to other vehicles and/or to other speeds. As drag varies with speed squared, the system will produce the largest drag reduction at higher speeds. By optimizing the design around use in a certain speed range, the device herein may be operated without any turbulence detectors or complicated control system.

BRIEF DESCRIPTION OF THE DRAWINGS

The disclosure will now be described with reference to the drawings wherein.

DESCRIPTION OF THE BEST AND VARIOUS EMBODIMENTS

Figure 1:
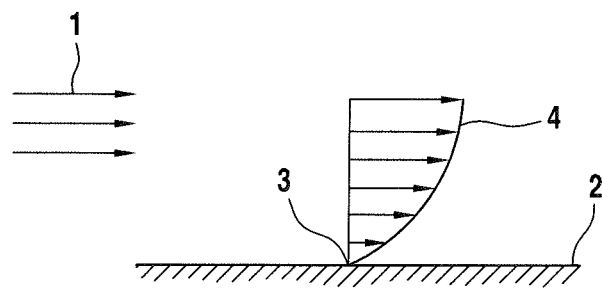
FIG. 1 depicts the formation of a boundary layer 4 that is formed by the freestream of air over stationary wall 2.
Figure 2:
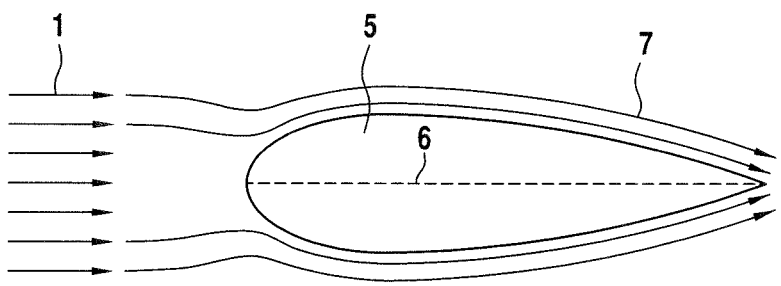
FIG. 2 depicts an attached boundary layer flow 7 around an airfoil 6.
Figure 3:
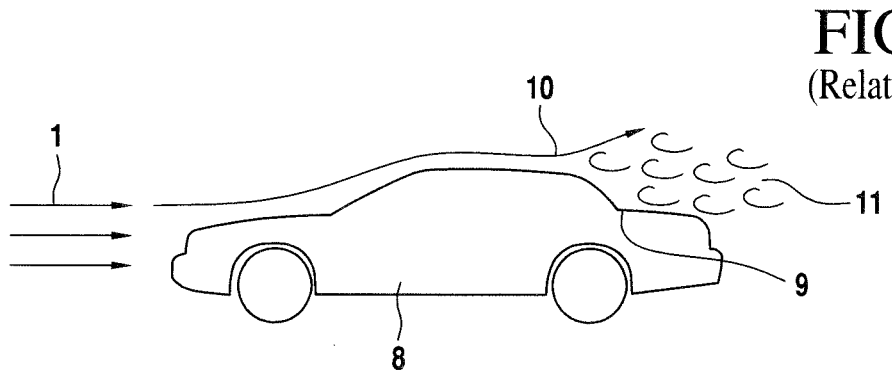
FIG. 3 depicts a separated boundary layer flow 10 and the low pressure wake 11 behind a car 8.
Figure 4:
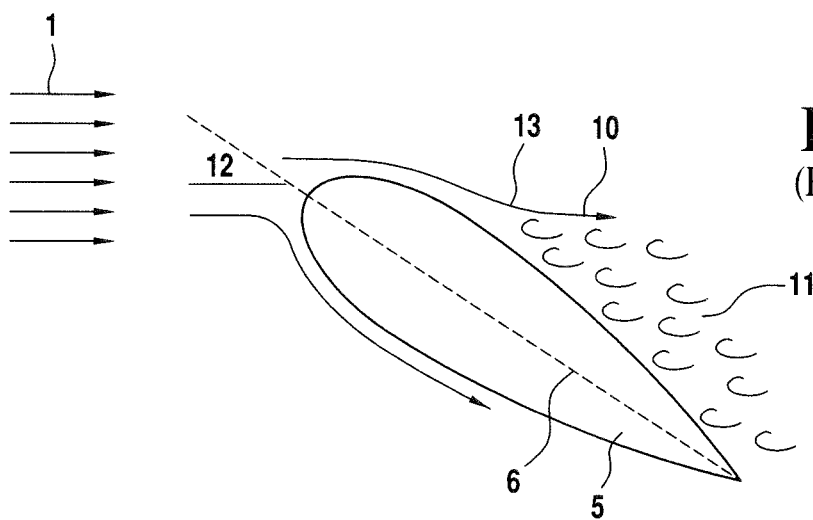
FIG. 4 depicts a separated boundary layer flow 10 from an airfoil 6 at a high angle of attack 12.
Figure 5:
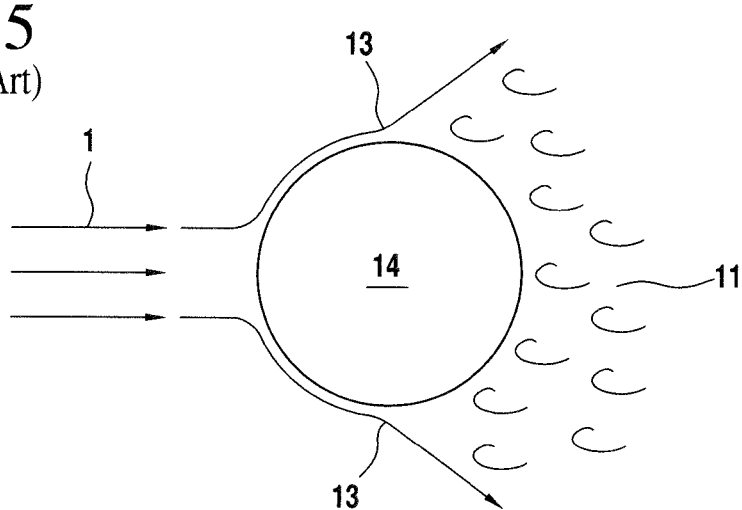
FIG. 5 depicts a separated boundary layer flow 13 from a smooth golf ball.

The foregoing and other objects, aspects, and advantages will be better understood from the following detailed description of the best and various embodiments. Throughout the various views and illustrative embodiments of the present disclosure, like reference numbers are used to designate like elements.

In a preferred embodiment, the boundary layer control system for reducing form drag is installed on a tractor trailer, which is a large bluff body otherwise producing large amounts of form drag. However, the instant boundary layer control system can be installed and used efficiently in a variety of ground vehicle applications as long as the increased vehicle efficiency from the reduction in form drag exceeds the energy required to power the source of compressed air. To achieve this efficiency, a compressed air source is controlled by an engine control unit (ECU) to inject compressed air into the intake port only when the ground vehicle is traveling at a predetermined speed or faster.

As a source of compressed air an engine auxiliary, such as the engine's supercharger, turbocharger, or compressor, or a blower dedicated to the task supplies a flow of high velocity air to a network of tubings having venturis. In a preferred embodiment, a supercharger is used as the compressed air source. Modern superchargers are typically driven by a clutched pulley which is activated by a duty cycle solenoid. The engine's electronic control unit (ECU) monitors a variety of engine performance characteristics and determines if the supercharger's output is required. If the output is not required, the supercharger's clutch remains disengaged and the supercharger does not act as a parasitic drag on the engine output. If the supercharger's output is required, the supercharger's clutched pulley is engaged via the duty cycle solenoid. The engine then powers the supercharger and the supercharger's output of compressed air is directed to the engine. A design of this type minimizes the parasitic load of the supercharger on the engine. Integration of the proposed drag reduction system with a supercharger controlled in this fashion will not introduce additional parasitic loads when the system is not in operation at reduced speed. At a speed when the drag reduction system is engaged, the ECU directs a portion of the supercharger output to the drag reduction system.

In another preferred embodiment, a turbocharger is used as a source of compressed air. Utilization of a turbocharger for the supply of high velocity air to the network of venturis does not introduce additional parasitic loads when the vehicle is not in service. Turbochargers are driven by the engine exhaust and are not driven directly from the engine as superchargers are. As with using a supercharger for the source of high speed air to the network of venturis, the use of a turbocharger as source of high speed air is controlled via the ECU.

In yet another preferred embodiment, a dedicated blower is used as a source of compressed air. For the purpose of minimizing the impact on the ECU a blower dedicated for use with the drag reduction system can be utilized. The dedicated drag reduction system blower can be controlled with the same type of duty solenoid controlled clutched pulley utilized with most modern superchargers. This eliminates any parasitic drag on the engine from the drag reduction system's blower when the system is not in operation. When the vehicle speed increases sufficiently to warrant the start of the active drag reduction system the output of the dedicated drag reduction system blower does not impact the amount of air being directed to the engine. By separating the source of air for the drag reduction system from the source of engine combustion air the ECU logic is simplified.

Regardless of the source of compressed air, the compressed air is injected into a network of tubings comprising venturis. In a preferred embodiment, a plurality of venturis is connected in series within a tubing. In the context of this disclosure, a plurality means two or more. Typically, the tubing is prepared by taking a cylindrical tubing and providing swaged sections to produce the contour depicted in FIG. 11. At the locations of reduced diameters, openings within the tubing wall are provided to thereby create the venturis. Preferably, the material for the tubing is chosen to be comparatively light weight but sturdy enough to retain its shape under the operating conditions of the ground vehicle. The tubings can be made from any number of materials including metals such as aluminum or stainless steel. However, the tubing material is not particularly limited and other materials suitable for the purpose may be employed.

Preferably, a plurality of tubings is provided on at least one side wall and/or the roof of the ground vehicle. Each of the tubings has a plurality of venturis, but the tubings may have a different number of venturis. For example, for installation on a tractor trailer shorter tubings with fewer venturis may be installed on the cab than on the trailer. In a preferred embodiment, the plurality of tubings is connected in parallel to the compressed air source. With preference, the tubing or tubings are aligned in a longitudinal direction of the ground vehicle.

Figure 13:
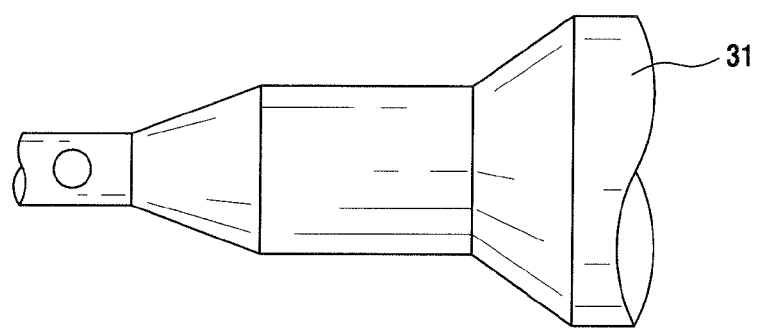
FIG. 13 depicts an exit port of a tubing 20 being formed as a diffuser 31.

The venturis create suction without using any moving parts. Suction is created by reducing the cross-sectional area of the tubing the air flows through, i.e., by forming a venturi throat within the tubing. As the cross-sectional flow area is reduced, the velocity of the air increases (sub-sonic flow). As the air's velocity increases its static pressure decreases. The reduction in static pressure then serves as a source of suction for the drag reduction system. The resulting combined flow of compressed air and low velocity air pulled in from the boundary layer is exhausted from the exit port in a high velocity jet to further prevent boundary layer separation downstream of the drag reduction system's venturis. In a preferred embodiment, the exit port of the tubing is formed as a diffuser as shown in FIG. 13. In another preferred embodiment, the opposite end of the tubing's intake port is used as the exit port and the exit port has the same diameter as the intake port.

Preferably, the tubings and the throats have circular cross-sections, but other cross-sections may also be selected. For example, the cross-sections may have a rectangular, square, triangular, elliptical, oval or semicircle shape, but other shapes are also possible. Further, the shape of the cross-section of the tubing may be the same or different from the shape of the throat. Typically, the venturi throat has a cross-section of from 0.5 cm to 10 cm. Also typically, the venturi opening has a cross-section of from 0.5 cm to 10 cm. With preference, the distance between two adjacent venturis from among the plurality of venturis is of from 10 cm to 200 cm. Also with preference, the distance between two adjacent tubings from among the plurality of tubings is of from 10 cm to 120 cm.

In a preferred embodiment, the plurality of venturis within one tubing have the same throat cross-section and the same venturi opening diameter because such an arrangement simplifies the manufacture of the tubings. However, in another preferred embodiment, throat cross-sections and/or venturi openings may be different within one tubing or between different tubings. In a particularly preferred embodiment, a venturi from among the plurality of venturis that is disposed closer to the intake port has at least one of a larger throat cross-section and a larger venturi opening diameter than a venturi being disposed closer to the exit port.

Optionally, the high velocity jet produced by the active boundary layer control system is directed from the exit port (with or without a diffuser) to passive boundary layer control devices or vortex generators. The vortex generators can take a variety of shapes, but are typically V-shaped with the tip pointing toward the trailing edge of the ground vehicle. Regardless of the shape the vortex generators take, they add fresh momentum to the boundary layer and further prevent separation. With preference, one or more vortex generators is disposed adjacent to the exit port of a tubing. In the context of this disclosure, adjacent means that the distance between the exit port and the vortex generator(s) is chosen such that at least a portion of the jet exhausted from the exit port flows over a vortex generator when the system is in operation. Thus, there may be a considerable distance between the exit port and the adjacent vortex generator. In a preferred embodiment, the distance between the vortex generator and the exit port is of from 10 cm to 500 cm.

Preferably, the vortex generators are placed as close to the vehicle's trailing edge as possible, but should not be placed downstream of the separation point. As the overall drag reduction system is preferably designed and optimized around highway speeds, the separation point of interest should remain in a limited area on the vehicles surface. In order to minimize the drag the vortex generators produce when the active boundary layer control system is not active—in other words at lower vehicle speeds—the height of the vortex generators preferably remains below the local thickness of the boundary layer.

In a typical embodiment, the boundary layer control system is built into the sidewalls and/or roof of the ground vehicle during the production of the vehicle. However, in another typical embodiment, the boundary layer control system is mounted onto an existing ground vehicle.

In order to accommodate the presence of water and debris the drag reduction system may be equipped with solenoid type control valves (on/off). The valves ensure that the system is free of debris and water at start-up and remains clean during operation. Drain valves are used to prevent the accumulation of water in the system when the system is not in service. Before air can be directed to the active portion of the boundary layer control system, the drain valve must be confirmed open. A contact switch is provided for this purpose. Once the source of compression is engaged the solenoid operated drain valves close. Upon shutdown of the active portion of the boundary layer control system the solenoid valve returns the drain valve to the open position. Finally, an anti-icing heating element 43 may be provided as needed to prevent the formation of ice in the system. However, depending on the ambient conditions the heat of compression alone may be sufficient to prevent the formation of ice.

In a preferred embodiment, the ground vehicle is selected from the group consisting of a tractor trailer truck, a train, a trailer, a delivery truck, a minivan, a station wagon, and a sports utility vehicle. In a particularly preferred embodiment, the ground vehicle is a tractor trailer truck.

Figure 7:
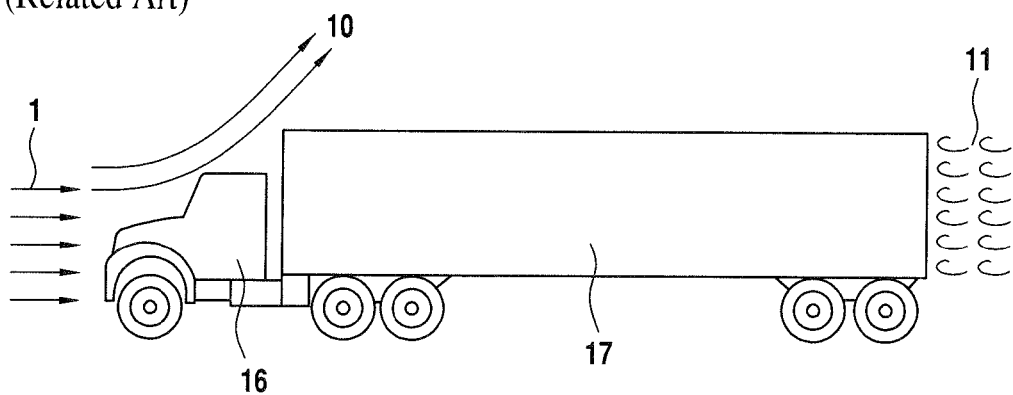
FIG. 7 depicts the current flow of air 10 over a tractor 16 and trailer 17.

FIG. 7 shows the flow of air 1 around the cab 16 and the trailer 17 of a conventional tractor trailer truck or "18-wheeler." The sharp discontinuity between the cab 16 and the trailer 17 causes a large amount of flow separation 10 which then contributes to a large low pressure wake 11 behind the truck. The pressure inside the wake 11 is lower than the pressure at the front of the truck. This pressure differential causes a net force in the opposite direction the vehicle is moving. Additional fuel must be fed to the truck's engine to counteract this drag force, which is, of course, form drag.

Figure 8:
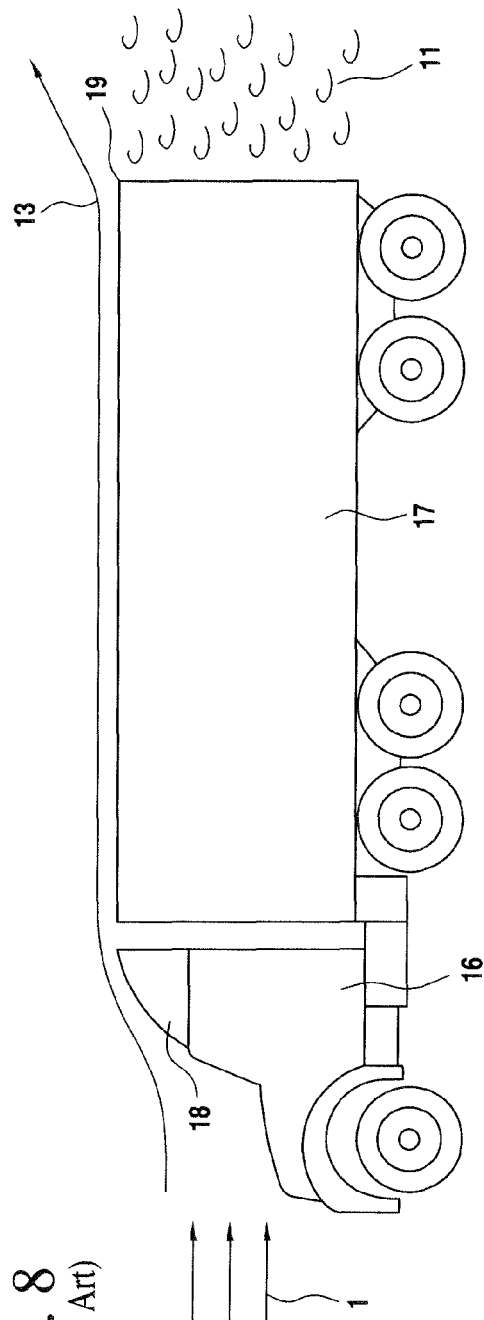
FIG. 8 depicts the flow 10 over a tractor trailer with aerodynamic fairing 18.

An attempt at reducing the vehicle's drag and increasing the fuel efficiency can be seen in FIG. 8, which shows a cab 16 and trailer 17 of a tractor trailer truck. The cab 16 has been fitted with a fairing 18. The fairing 18 eliminates the sharp discontinuity between the cab 16 and the trailer 17. As a result, the air flowing over the cab 16 is able to flow over the fairing 18 without separating. By avoiding separation the form drag is reduced at the transition from the cab 16 to the trailer 17. The boundary layer separates at separation point 13.

However, a significant source of form drag remains and that is the flow of air over the trailer's trailing edge 19. As with the flow of air between the cab 16 and the trailer 17 in FIG. 7, the air flowing over the trailing edge 19 in FIG. 8 is unable to turn inward because of the trailer's shape. Because the air cannot turn inward it separates from the vehicle's trailing edge 19 at the separation point 13 and a low pressure wake 11 is produced. In the same way that the fairing 18 was added to smooth out the transition from the cab 16 to the trailer 17, aerodynamic streamlining features could be added to the trailer 17.

Nevertheless, there are practical problems associated with utilizing streamlining at the trailer's trailing edge 19. For example, there are limits on the length of tractor trailers and any sort of effective streamlining that could be provided while still ensuring sufficient transport capacity for goods. In addition, depending on the aerodynamic streamlining features used there is the very real prospect that these features would interfere with the operation of the trailer doors, in particular when approaching a loading dock or during on- and off-loading of the truck. Moreover, streamlining features that impair the truck driver's view should be avoided. The boundary layer control system disclosed herein provides for a reduction in form drag without impeding the practicality of the ground vehicle.

Figure 6:
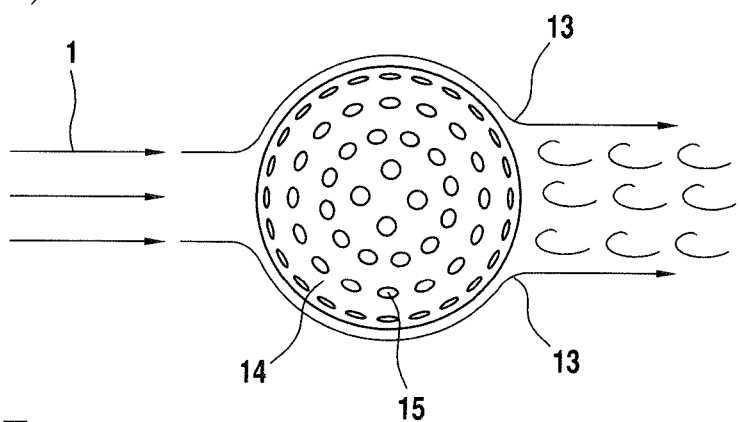
FIG. 6 depicts the delayed separation of boundary layer 13 from a dimpled golf ball 15.

Consequently, the instant disclosure achieves a reduction of the form drag from ground vehicles by delaying the drag inducing flow separation occurring at a vehicle trailing edge or any sharp shape discontinuity. It is the separation of flow that then produces the large low pressure wake, which contributes such a large component to the overall vehicle's aerodynamic drag. Similarly to the dimpled golf ball of FIG. 6, a reduction in aerodynamic drag is achieved by delaying the separation of the boundary layer.

Figure 9:
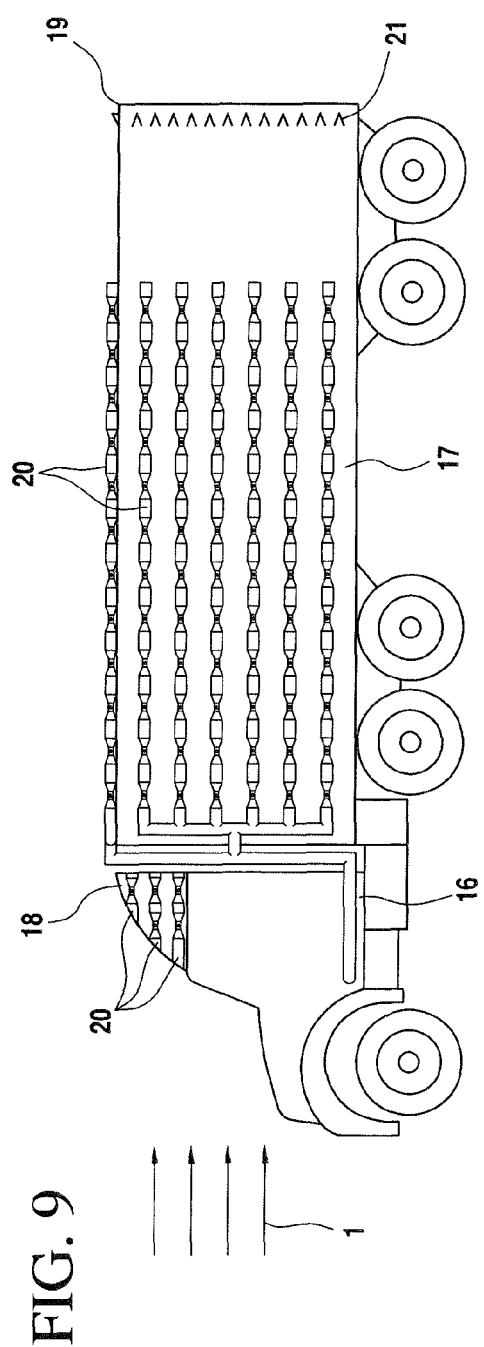
FIG. 9 depicts a boundary layer control system, which includes a plurality of tubings 20 attached to the fairing 18 of tractor 16 and to the side walls and the roof of trailer 17.

A preferred embodiment of a device for reducing aerodynamic drag of a ground vehicle can be seen in FIG. 9. As before there is a freestream of air 1, which flows over a truck comprised of cab 16 and trailer 17. The cab has been fitted with a fairing 18 to reduce the flow separation that may occur as the air transitions between the cab 16 and the trailer 17. However, active and passive elements of a drag reduction system have been added. The active element uses the introduction of energy from another source to reduce form drag. A passive element may be coupled to the active element to increase efficiency of drag reduction. The passive element utilizes the energy that is already in the flowing stream of air. In a preferred embodiment, the active element is a network of connected tubings 20, each tubing having multiple venturis. The passive element is an array of vortex generators 21 disposed upstream of what would otherwise be the separation point for the air flowing over the trailer. Typically, the separation point 13 as shown in FIG. 8 for a trailer truck without a boundary layer control system is formed at a different location relative to the trailer than the separation point of a truck with a boundary layer control system. In a preferred embodiment, one vortex generator 21 is provided per tubing 20. In another preferred embodiment, two or three vortex generators are provided per tubing 20. In yet another preferred embodiment, the passive aerodynamic boundary layer control devices are only provided at the trailing edge 19 of the trailer 17.

Figure 10:
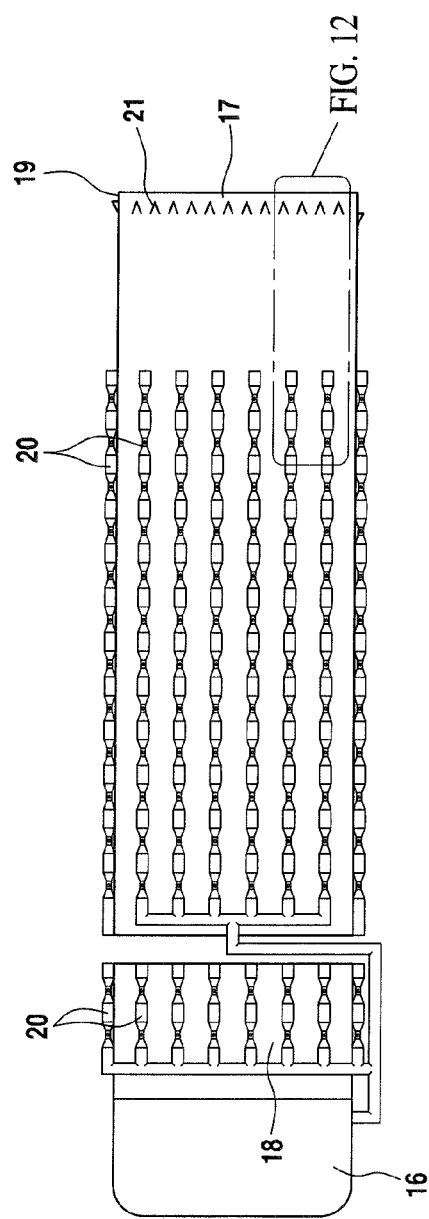
FIG. 10 shows a top view of FIG. 9.

As shown in FIG. 10, the network of venturis are located toward the leading edge of the trailer and integrated into the fairing 18 that assists the air in transitioning from flowing over the cab 16 to flowing over the trailer 17. FIG. 10 shows a top view of the trailer truck of FIG. 9. The boundary layer control system does not require the use of a fairing 18, but the benefits of the fairing 18 enhance the disclosed boundary layer control system. The use of a fairing 18 also minimizes the amount of energy needed for providing compression to the network of venturis.

Figure 11:
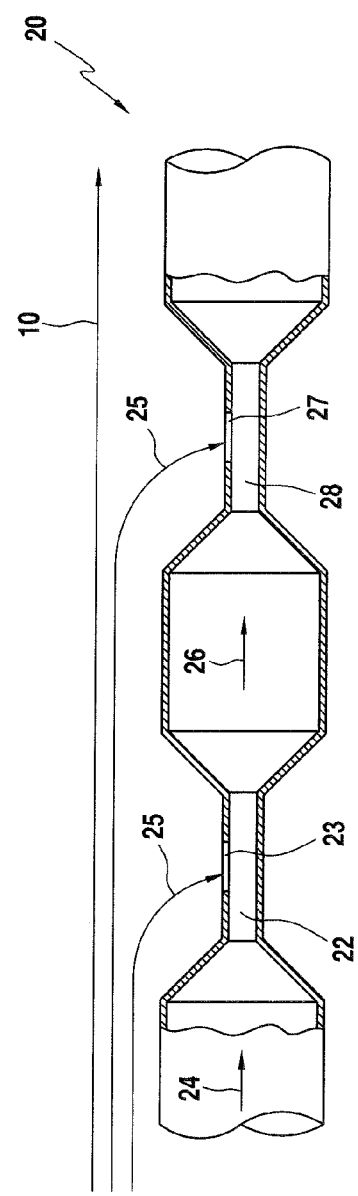
FIG. 11 shows a tubing 20 with two venturis 23 and 27 for creation of suction.

High pressure air is injected into the tubings 20 having a plurality of venturis. An elevation view of a representative section of a plurality of venturis in a tubing is depicted in FIG. 11. As can be seen in FIG. 11, each individual venturi 23, 27 contains an area of minimum cross-sectional area, the throat 22, 28. For the pressure ranges of interest in the disclosed device, the air flows at sub-sonic speed. As the cross sectional area of the tubing 20 contracts the speed of the air 24 flowing in the tubing increases. The airspeed continues to increase until the air flows within the throat 22. The energy of the air 24 flowing through the network of tubings must be conserved. The conservation of energy relationship for a flow of this type is most easily expressed using Bernoulli's law. This law states, among other things, that as the velocity of a fluid is increased its static pressure will drop. As a result, while the air's velocity is highest at the venturi throat 22, the air's static pressure is lowest.

The low pressure created at the throat acts as a source of suction and draws in low energy air 25 from the boundary layer through the venturi opening. This low energy air is the air that would otherwise separate as flow 10 at separation point 13 in FIG. 8. By reducing or avoiding separation, form drag is reduced. The air 26 downstream of the throat 22 is now comprised of low energy air from the boundary layer 25, as well as the air originally injected into the tubings 20. This air 26 flows to the next downstream venturi 27, where the process seen at the upstream venturi 23 is repeated. Namely, air 26 flows into the downstream venturi throat 28 where the air's velocity increases and its pressure decreases. The reduced pressure at the throat 28 acts as a source of suction and draws in low energy air 25 from the boundary layer air 10 flowing over the trailer 17 and prevents or minimizes separation.

In a preferred embodiment, the instant method of reducing aerodynamic drag of a ground vehicle includes providing a vortex generator adjacent to the exit port. In another preferred embodiment, the method includes determining a minimum vehicle speed at which injecting compressed air from the compressed air source into the intake port saves more energy by reducing the aerodynamic drag of the ground vehicle than is expended by the compressed air source injecting the compressed air into the intake port; and, injecting the compressed air only when the ground vehicle is travelling at least at the minimum vehicle speed. With preference, the minimum vehicle speed is from 40 mph to 80 mph.

Figure 12:
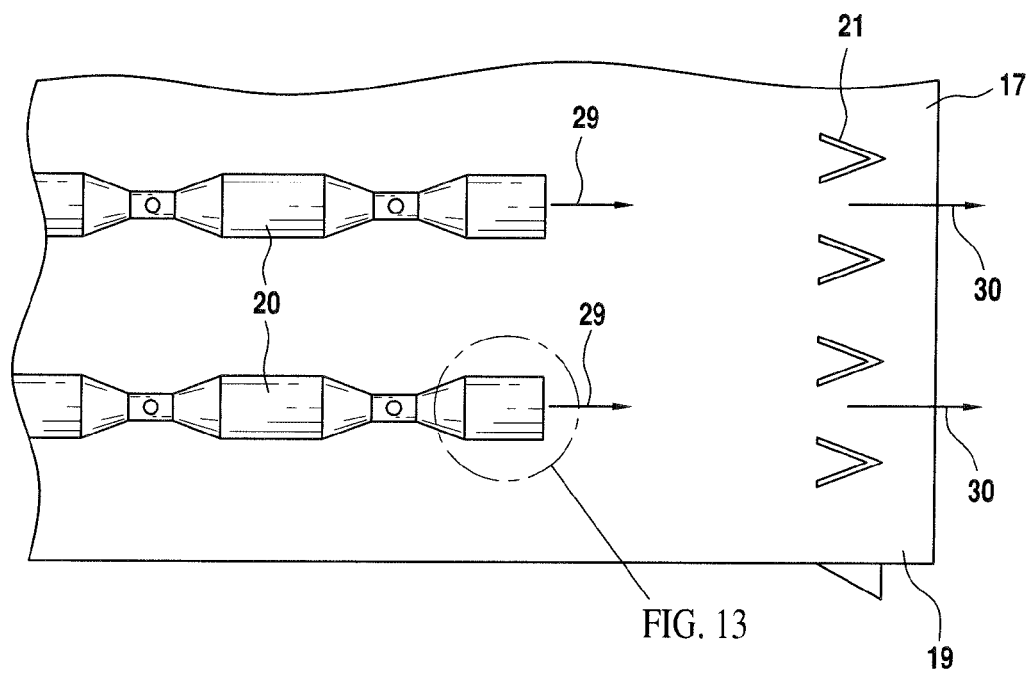
FIG. 12 shows an enlarged view of the rectangular area in FIG. 10 to depict venturis exhausting to vortex generators 21 at the trailing edge 19 of trailer 17.

In a preferred embodiment, the network of tubings containing the venturis does not run the entire length of the trailer 17. As depicted in FIG. 10, the tubings extend over approximately 80% of the length of the trailer. However, other lengths of tubings may be provided. In a preferred embodiment, the lengths of the tubings extend between 50% and 95% of the length of the trailer. In another preferred embodiment, the network of tubings 20 runs long enough to prevent large scale separation of flow and the attendant production of form drag. Further reduction of boundary layer separation is accomplished by exhausting the air from the network of tubings 20 in a concentrated jet 29 from the exit port of the tubings, as depicted in FIG. 12. The concentrated jet 29 is directed from the exit port to vortex generators 21. The flow of the concentrated jet 29, coupled with the action of the vortex generators 21, increases the energy of the air 30 flowing over the trailing edge 19. The combined effect of the jet and the vortex generators is to reduce trailing edge separation and with it aerodynamic drag on the vehicle by a reduction in form drag. In analogous manner to the dimples 15 on the golf ball 14 seen in FIG. 6, the active and the optional passive control elements prevent or reduce boundary layer separation.

In another preferred embodiment, the boundary control system employs both active and passive boundary layer control elements. By virtue of using the same stream of air as both a source of suction for the venturis and the concentrated jet 29, the maximum benefit accruing from the energy necessary to provide the compressed air 24 is obtained.

In the preferred embodiment depicted in FIG. 13, a diffuser 31 is disposed at the exit port of the tubing. Thus, air exhausting from the exit port of tubing 20 is streaming through a diffuser 31 where the air loses momentum before flowing to the vortex generator(s). All of the exit ports or only a subset thereof may be provided with diffusers. The diffusers may be made from the same material that the tubing may be made, and the diffusers may be made simultaneously with the tubings or subsequently attached. With preference, the boundary layer control system is optimized to achieve the largest reduction in form drag when the ground vehicle is traveling at highway speeds. However, the disclosure is not limited to highway speeds. Rather, the system can be adapted to various speeds. For example, if the form drag reduction device is mounted on a train, the device is optimized for speed ranges higher than highway speed. Optimization is preferably accomplished by varying one or more of the following: the flow rate of the injected air 24, the diameter of the tubing 20, the diameter of the venturi openings, the cross-section of the throats, the distance between and the number of venturis within a tubing, the length of the tubing, the distance between tubings attached to a side wall or the roof of the ground vehicle, if present, the distance between the vortex generator (s) and the exit port of the tubings, the size and shape of the vortex generators, and the number of vortex generators per tubing.

In a preferred embodiment, no compressed air is injected into the tubings for those speeds where the reduction in form drag is not sufficiently large to justify the energy consumption in the active boundary layer control system. As the aerodynamic drag increases exponentially with speed, the majority of form drag reduction benefits are achieved at higher vehicle speeds. Optimizing the system to operate in a specific range of speeds also greatly minimizes the number of components needed to achieve form drag reduction. In a preferred embodiment, the system is installed without sensors for monitoring turbulence or pressure over any part of the vehicle. However, the use of such sensors is not precluded. In addition, because the flow patterns remain fairly constant at typical vehicle speeds of ground vehicles, the network of tubings 20 can be located at fixed vehicle locations and still provide the maximum drag reduction benefit. Thus, it is possible to manufacture large numbers of tubings with predetermined dimension to reduce the cost per tubing while still providing energy savings to different kinds of ground vehicles. However, for optimal form drag reduction for a specific ground vehicle, the above-listed parameters are optimized to provide a tailored boundary layer control system for that specific ground vehicle.

The source of high pressure air 24 that flows through the network of tubings is provided by a work consuming device of some type—blower, turbocharger, supercharger or compressor. Large commercial trucks are almost always fitted with a supercharger or turbocharger. A portion of the air discharging from these devices can be injected into the network of tubings 20. In a preferred embodiment, the device for producing air flow 24 is a turbocharger. Turbochargers are powered by engine exhaust gases and not directly by the engine itself as superchargers are. Moreover, turbochargers are fitted with a waste-gate or bypass valve that directs some of the useful turbocharger output away from the engine intake to avoid overstressing the engine. In circumstances where the waste-gate or bypass valve would otherwise be open, this excess turbocharger output is injected into the tubings 20 and the additional energy required to operate the active boundary layer control system is minimized.

Utilization of an existing engine auxiliary like a supercharger or turbocharger for the source of high pressure air 24 typically requires modification of the engine's electronic control unit (ECU). The ECU monitors a variety of engine and vehicle variables and directs the correct amounts of air and fuel to the engine. Thus, the ECU must account for compressed air injected into the active boundary layer control system instead of the engine. In addition, and in spite of the fact that the additional energy consumption of the compressed air source is less than the energy savings resulting from the reduction in form drag, the capacity of the supercharger or turbocharger may need to be increased to accommodate the air flow of the active boundary layer system. An active boundary layer control system that integrates existing engine auxiliaries—turbochargers, superchargers—into its design can be more easily integrated into existing vehicles than an active boundary layer control system that utilizes a dedicated source of high pressure air. However, a source of high pressure air 24 provided by a dedicated blower or compressor simplifies modifications to the ECU because the source of combustion air for the engine and high pressure air for the boundary layer control system are independent.

Figure 14:
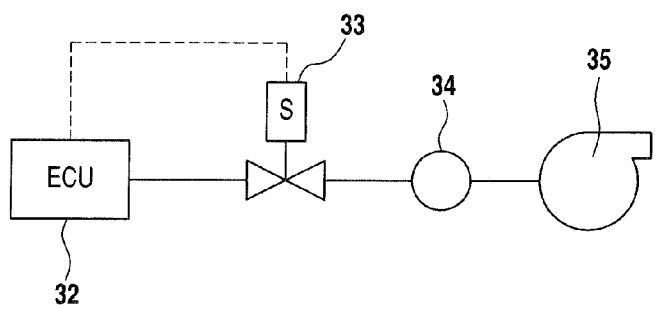
FIG. 14 depicts a schematic of ECU 32 control of blower 35 through duty solenoid 33.

Regardless of the source of high pressure air the system is only engaged at vehicle speeds sufficiently high to warrant the parasitic energy consumption of driving the source of high pressure air. For components powered by the engine, for example a supercharger or a blower whose output is dedicated to the active boundary layer control system, engaging/disengaging the active boundary layer control system is easily integrated into either existing or new engines by the use of a duty solenoid and a clutched pulley, see FIG. 14. In particular, FIG. 14 shows an engine ECU 32, duty solenoid 33, clutched pulley 34, and a source of high pressure air 35, which in this case is a blower. When the ECU 32 determines that the vehicle is traveling sufficiently fast to engage the active boundary layer control system, the ECU sends a signal to the duty solenoid 33. The duty solenoid then engages the clutched pulley and the engine is able to power the source of high pressure air for the active boundary layer control system.

Figure 15:
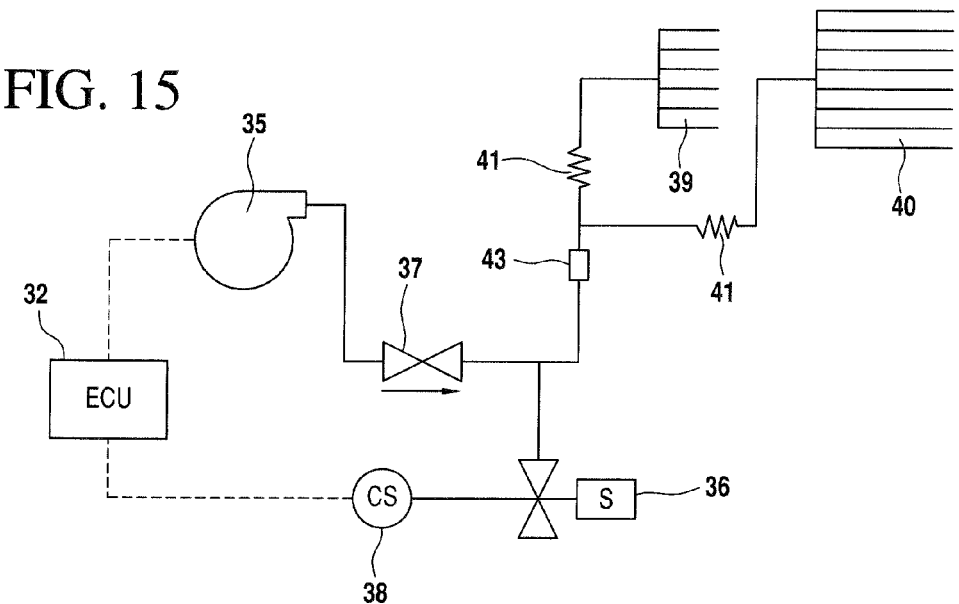
FIG. 15 depicts a drain system and a schematic layout of tubings on cab and trailer.

There are some mechanical aspects of the system that are required to accommodate exposure to the atmosphere and the system's physical layout. Because the system can be exposed to rain and the elements, it is advantageous to integrate drains into the system design to keep water from damaging the source of high pressure air 35 (blower, compressor, supercharger, turbocharger). In a preferred embodiment, much of the active boundary layer control system is located at the top of the ground vehicle, and a low point drain is incorporated into the system, as depicted in FIG. 15. Specifically, FIG. 15 shows a drain layout that includes a solenoid operated drain valve 36 and check valve 37. A permissive for starting the blower, supercharger or other source of high pressure air 35 for the active boundary layer control system is for the solenoid operated drain valve to be open. The open/closed status of the solenoid valve 36 is monitored with a contact switch 38. Preferably, the solenoid operated drain valve remains open while the active boundary layer system is not in operation to prevent accumulation of water in the system. Once the blower, supercharger, or other source of high pressure air 35 for the active boundary layer control system is up to speed and producing pressure, the solenoid operated drain valve 36 closes to maximize the suction created at the venturis.

In a preferred embodiment, the active portion of the boundary layer control system is provided on large commercial vehicles like trucks. Typically, the system is installed such that it is possible to separate the active elements that act on the cab and the trailer. FIG. 15 shows two active boundary layer control systems 39 and 40, which act on the cab and on the trailer, respectively. Also typically, the active boundary layer control systems 39 and 40 are connected to the source of compression via expansion joints 41. The expansion joints 41 allow the system to withstand thermal expansion and any relative motion between the cab 16 and the trailer 17. Further, the expansion joint 41 also allows for a relatively quick disconnect between the cab 16 and the trailer 17, when desired.

Figure 16:
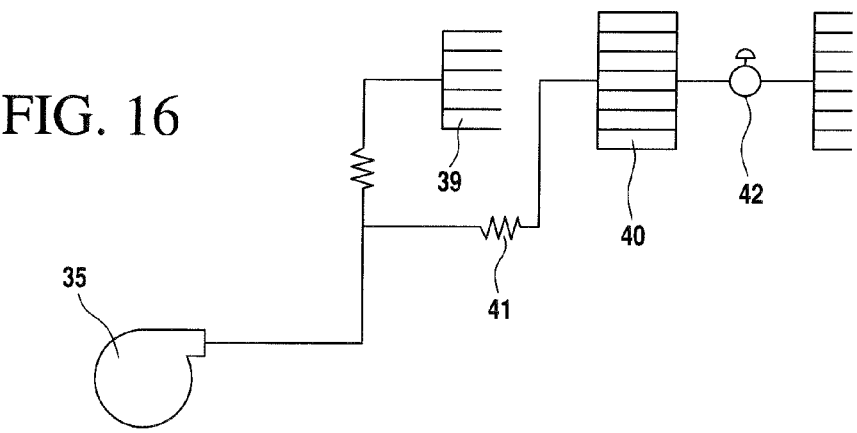
FIG. 16 depicts an alternate layout with discharge valve 42 to allow purging.

In yet another preferred embodiment, discharge valve 42 can be integrated into the system as well, see FIG. 16. This valve—or valves if more than one valve is provided—remains closed as the source of compression begins to generate pressure in the active boundary layer control system. By remaining shut, air is forced through the venturis to partially or completely prevent the accumulation of dirt or debris in the system. After a few seconds in the closed position the discharge valve 42 opens and the venturis are able to create suction. Heating element 43 as shown in FIG. 15 is controlled by the ECU and prevents formation of ice or melts ice that has been formed in the tubings when the vehicle has not been used for a while.

The embodiments described hereinabove are further intended to explain best modes known of practicing it and to enable others skilled in the art to utilize the disclosure in such, or other, embodiments and with the various modifications required by the particular applications or uses. Accordingly, the description is not intended to limit it to the form disclosed herein. Also, it is intended that the appended claims be construed to include alternative embodiments.

The foregoing description of the disclosure illustrates and describes the present disclosure. Additionally, the disclosure shows and describes only the preferred embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purpose, as if each individual publication, patent or patent application were specifically and individually indicated to be incorporated by reference. In the case of inconsistencies, the present disclosure will prevail.

What is claimed is:

1. A device for reducing aerodynamic drag of a ground vehicle, the device comprising:
    a tubing having an intake port, an exit port, and a plurality of venturis; and,
    a compressed air source being fluidly connected to the intake port;
    wherein the plurality of venturis is disposed between the intake port and the exit port; and,
    wherein each venturi from among the plurality of venturis has a throat and a venturi opening on an outer periphery of the venturi throat to remove a portion of a fluid from a boundary layer of the ground vehicle.

2. The device according to claim 1, wherein the compressed air source is selected from the group consisting of an engine auxiliary and a dedicated blower.

3. The device according to claim 1, wherein the compressed air source is controlled by an engine control unit to inject compressed air into the intake port only when the ground vehicle is travelling at a predetermined speed or faster.

4. The device according to claim 1, wherein the plurality of venturis is connected in series.

5. The device according to claim 1, wherein a plurality of tubings is provided on at least one of a side wall and a roof of the ground vehicle; and,
    wherein the plurality of tubings is connected in parallel to the compressed air source.

6. The device according to claim 5, wherein a distance between two adjacent tubings from among the plurality of tubings is of from 10 cm to 120 cm.

7. The device according to claim 1, further comprising a diffuser being disposed at the exit port.

8. The device according to claim 1, further comprising a vortex generator being disposed adjacent to the exit port.

9. The device according to claim 8, wherein the vortex generator is disposed at a trailing edge of the ground vehicle.

10. The device according to claim 8, wherein a distance between the vortex generator and the exit port is of from 10 cm to 500 cm.

11. The device according to claim 1, wherein the tubing further comprises at least one of an internal heating element and a drain valve.

12. The device according to claim 1, wherein the plurality of venturis have a same throat cross-section and a same venturi opening diameter.

13. The device according to claim 1, wherein the tubing is aligned in a longitudinal direction of the ground vehicle.

14. The device according to claim 1, wherein the throat has a cross-section of from 0.5 cm to 10 cm.

15. The device according to claim 1, wherein the venturi opening has a cross-section of from 0.5 cm to 10 cm.

16. The device according to claim 1, wherein a distance between two adjacent venturis from among the plurality of venturis is of from 10 cm to 200 cm.

17. The device according to claim 1, wherein the ground vehicle is a tractor trailer truck.

18. A method of reducing aerodynamic drag of a ground vehicle comprising:
    providing a tubing on at least one of a roof and a side wall of the ground vehicle, the tubing having an intake port, an exit port, and a plurality of venturis disposed between the intake port and the exit port;
    fluidly connecting a compressed air source to the intake port; and,
    removing a portion of a fluid from a boundary layer of the ground vehicle by suction through a venturi opening located on an outer periphery of each throat venturi.

19. The method of claim 18, further comprising:
    providing a vortex generator adjacent to the exit port.

20. The method according to claim 18, further comprising:
    determining a minimum vehicle speed at which injecting compressed air from the compressed air source into the intake port saves more energy by reducing the aerodynamic drag of the ground vehicle than is expended by the compressed air source injecting the compressed air into the intake port; and, injecting the compressed air only when the ground vehicle is travelling at least at the minimum vehicle speed.

21. The method according to claim 20, wherein the minimum vehicle speed is of from 40 mph to 80 mph.

* * * * *